(12) United States Patent
Rau et al.

(10) Patent No.: US 7,761,975 B2
(45) Date of Patent: Jul. 27, 2010

(54) METHOD OF MAKING A STATOR OF AN ELECTRICAL MACHINE

(75) Inventors: Eberhard Rau, Korntal-Muenchingen (DE); Thomas Berger, Ditzingen (DE); Martin Henne, Moeglingen (DE); Klaus Pflueger, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 1023 days.

(21) Appl. No.: 10/527,917

(22) PCT Filed: Jul. 7, 2003

(86) PCT No.: PCT/DE03/02253
§ 371 (c)(1),
(2), (4) Date: Oct. 14, 2005

(87) PCT Pub. No.: WO2004/030179
PCT Pub. Date: Apr. 8, 2004

(65) Prior Publication Data
US 2006/0125341 A1 Jun. 15, 2006

(30) Foreign Application Priority Data
Sep. 20, 2002 (DE) .............................. 102 43 986

(51) Int. Cl.
*H02K 15/02* (2006.01)
(52) U.S. Cl. .................... 29/596; 310/216.136
(58) Field of Classification Search .............. 29/596, 29/598; 310/254, 216.136; 361/19
See application file for complete search history.

(56) References Cited

U.S. PATENT DOCUMENTS 4,102,040 A * 7/1978 Rich ........................... 29/598
5,583,387 A 12/1996 Takeuchi et al.
6,317,962 B1 * 11/2001 Adachi et al. ................. 29/596
6,810,007 B1 10/2004 Kim (Continued)

FOREIGN PATENT DOCUMENTS

DE 39 06 368 A1 9/1989

(Continued)

OTHER PUBLICATIONS

Machine Translation of JP2001-231190A.*

(Continued)

*Primary Examiner*—A. Dexter Tugbang
*Assistant Examiner*—Livius R Cazan
(74) *Attorney, Agent, or Firm*—Michael J. Striker

(57) ABSTRACT

The method for making a stator includes making individual strip-shaped laminas (15) for it; stacking the laminas (15) to form a stator core (13) with grooves (18) on one side extending through the core; producing a subassembly by inserting a stator winding (17) into the grooves (18); bending the subassembly to form a cylindrical cavity so that the grooves (18) end in the cavity and connecting two ends (23) of the stator core (13) to each other by a welding seam (20) to maintain this configuration. To produce a welding seam of sufficient strength which does not exert excessive influence on magnetic properties, the welding seam depth ($T_S$) is given by $T_S = 0.5 \text{ mm} * (H_{yoke}/\text{mm} - 1) \pm \Delta T_S$, wherein $H_{yoke}$ is yoke height and $\Delta T_S$ is a tolerance value. An electric machine including the stator made by this method is also described.

7 Claims, 3 Drawing Sheets

U.S. PATENT DOCUMENTS

2001/0005104 A1    6/2001    Nakahara et al.

FOREIGN PATENT DOCUMENTS

| FR | 2 641 909 | 7/1990 |
|----|-----------|--------|
| JP | 57062759 | 4/1982 |
| JP | 90/09863 | 9/1990 |
| JP | 7007875 | 1/1995 |
| JP | 10-155248 | 6/1998 |
| JP | 2000-295192 | 10/2000 |
| JP | 2001-186697 | 7/2001 |
| JP | 2001231190 A * | 8/2001 |
| WO | 90/09863 | 9/1990 |

OTHER PUBLICATIONS

Patent Abstract of Japan 2001231190 of Aug. 24, 2001.
Patent Abstract of Japan JP 9103952 of Nov. 20, 2001.

* cited by examiner

METHOD OF MAKING A STATOR OF AN ELECTRICAL MACHINE

The present application is a National Stage entry of International Application No. PCT/DE03/02253, filed Jul. 7, 2003.

BACKGROUND OF THE INVENTION

The present invention relates to a method of making a stator for an electrical machine, and to an electrical machine including a stator made by the method.

A stator and electric machine of the type on which the present invention is based are already known from Japanese patent application 9-103052. To manufacture this stator, first, individual sheet-metal lamina are stamped out and a particular number of these sheet-metal lamina are stacked one on top of another until the desired axial breadth of the core is achieved. These stacked sheet-metal lamina constitute the stator core, which has teeth and grooves arranged parallel to one another on one side in a manner that is customary for a stator. A pre-wound core winding is produced, for example, in an approximately planar form and is then inserted into the grooves of the for example essentially flat core. The subassembly comprised of the core and core winding is then bent in a circular fashion so as to yield a hollow, cylindrical stator. After the circular bending of the subassembly comprised of the stator yoke and winding, the two ends are connected to each other by welding. The welded connection between the two ends is a multiply loaded joint whose specific embodiment cannot be gleaned from any known technical teaching in the prior art.

SUMMARY OF THE INVENTION

It is an object of the present invention to provide a method of making a stator according to the present invention, which includes providing an improved welding seam between two ends of the subassembly.

It is a further object of the present invention to provide an electric machine including a stator made by the method according to the invention for making the stator.

This object and others, which will be made more apparent hereinafter, are attained in method of making a stator of an electric machine, which comprises making individual generally strip-shaped laminas; stacking the individual laminas to form a stator core with a yoke having a yoke height, so that one side of the stator core is provided with grooves extending through the core; producing a subassembly by inserting a stator winding into the grooves of the stator core; bending the subassembly in a circular fashion to produce a cylindrical cavity in which the grooves end and, in order to maintain the foregoing configuration with the cylindrical cavity, connecting at least two ends of the stator core to each other by means of a welding seam.

According to the invention the welding seam depth ($T_S$) is a function of the yoke height ($H_{yoke}$) and a tolerance value ($\Delta T_S$) and is given by the following yoke, formula (I):

$$T_S = 0.5 \text{ mm} * (H_{yoke}/\text{mm} - 1) \pm \Delta T_S. \quad (I)$$

The stator made by the method according to the present invention has the advantage that by specifying the welding seam depth as a function of the effective yoke height and a tolerance value for the welding seam depth, a rule has been established that permits sure, reliable control of the multiple parameters that influence the stator of an electric machine, on the one hand so as to reliably prevent the welding seam from tearing open at the joint after being welded and, on the other hand, so as not to exert an excessive, disadvantageous influence, for example on the electromagnetic properties of the stator core at the joint. The rule provided for determining the welding seam depth $T_S$, according to which the welding seam depth $T_S$ is determined as a function of the yoke height $H_{yoke}$ and a tolerance value $\Delta T_S$ in accordance with the following function $$T_S = 0.5 \text{ mm} * (H_{yoke}/\text{mm} - 1) \pm \Delta T_S,$$

on the one hand gives the welding seam a sufficient strength to allow it, with a certain yoke height, to absorb the tensile forces occurring in the welding seam, but on the other hand, the welding seam is not too deep so that it does not exert too excessive a negative influence on the magnetic properties at the welding point due to structural changes occurring in the yoke. One of these influences, for example, is the magnitude of undesirable eddy current losses that occur.

If the variable $\Delta T_S$ is equal to 1 mm, then this yields a secure welded connection for the resulting minimum value and on the other hand, does not have an excessively deep welding seam that approaches the maximum value.

If the value $\Delta T_S$ is equal to 0.5 mm, then the welding seam quality can be reproduced with particular reliability.

If the welding seam depth $T_S$ does not fall below a minimum value $T_{Smin}$ as a function of the yoke height $H_{yoke}$, where the minimum value $T_{Smin}$ is proportional to the yoke height $H_{yoke}$ multiplied by the factor 3/40, then this yields a minimum strength of the welding seam for various yoke heights $H_{yoke}$.

If the yoke is embodied at the joint so that two teeth are disposed on the outside of the joint, then this yields the positive effect that on the one hand, the weld is disposed particularly far away from the yoke and on the other hand, even during the welding process, a relatively large degree of heat can be dissipated by this outer tooth. Part of the heat therefore does not reach the yoke, which results in less powerful influences being exerted on the electromagnetic properties of the yoke.

If the welding seam is disposed on a radial inside of the yoke so that the joint is disposed at the tip of a tooth, then this reliably prevents vibration of these half teeth.

The welding seam is also disposed on at least one axial end of the stator. This reduces the magnetic noise at this point.

If the welding seam is a laser beam welding seam, then the embodiment of the weld permits the method for manufacturing the welding seam to be executed in a particularly reliable fashion. The welding parameters can be reliably adjusted, no additional application of welding material is made, and the welding heat is significantly reduced in comparison to other methods for example deposit welding. Furthermore, the stator core is comprised of a material that has a carbon content of more than 0.1% (by mass).

The carbon content influences the brittleness of the welding seam and therefore its durability, for example when subjected to oscillatory loads.

BRIEF DESCRIPTION OF THE DRAWING

Exemplary embodiments of a stator and an electric machine according to the present invention are shown in the drawings.

DETAILED DESCRIPTION OF THE INVENTION

Figure 1:
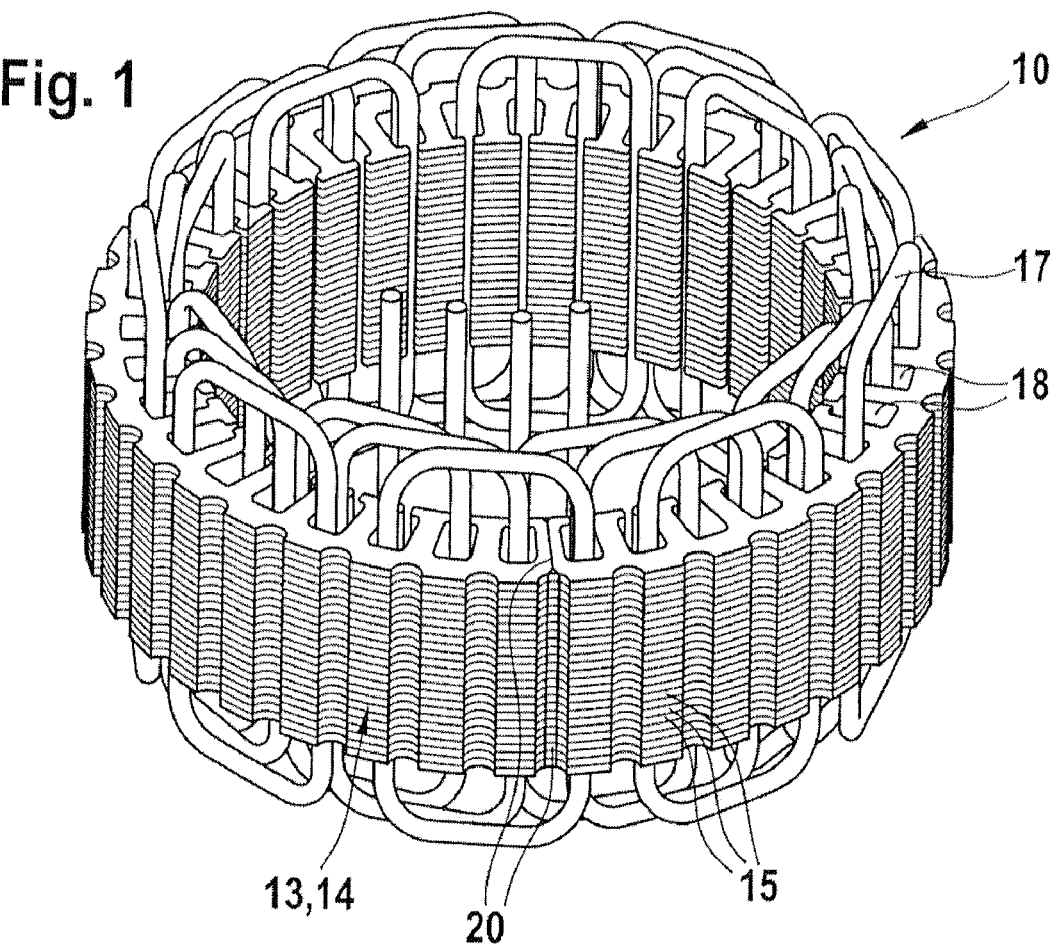
FIG. 1 is a perspective view of a stator according to a first exemplary embodiment.

FIG. 1 shows a stator 10 of an electric machine. The stator 10 has an annular stator core 13 comprised of a stator core segment 14. The stator core 13 in this instance is comprised of a stator core segment 14 that is in turn comprised of a multitude of stator laminas 15. As in the prior art, the stator core 13 has inwardly oriented radial grooves 18 into which a stator winding 17 is inserted. This stator 10 is manufactured as described below. Individual, generally strip-shaped stator lamellas 15 are manufactured, which can extend in arcs or straight lines. The individual stator laminas 15 are stacked or bundled so that one side is provided with grooves 18 extending all the way through the stack, into which the stator winding 17 is later inserted. After the insertion of the stator winding 17, this produces a subassembly comprised of the stator core 13 and the stator winding 17, which subassembly is then bent in a circular fashion so as to produce a cylindrical cavity in which the grooves 18 end. In order to preserve this state, at least two ends of the stator core 13 that face each other after the circular bending are fixed in place by means of a welding seam 20. Otherwise, the stator 10 would gape open at the joint. It would be hardly possible to install it in a cylindrical bore of a housing.

Figure 2:
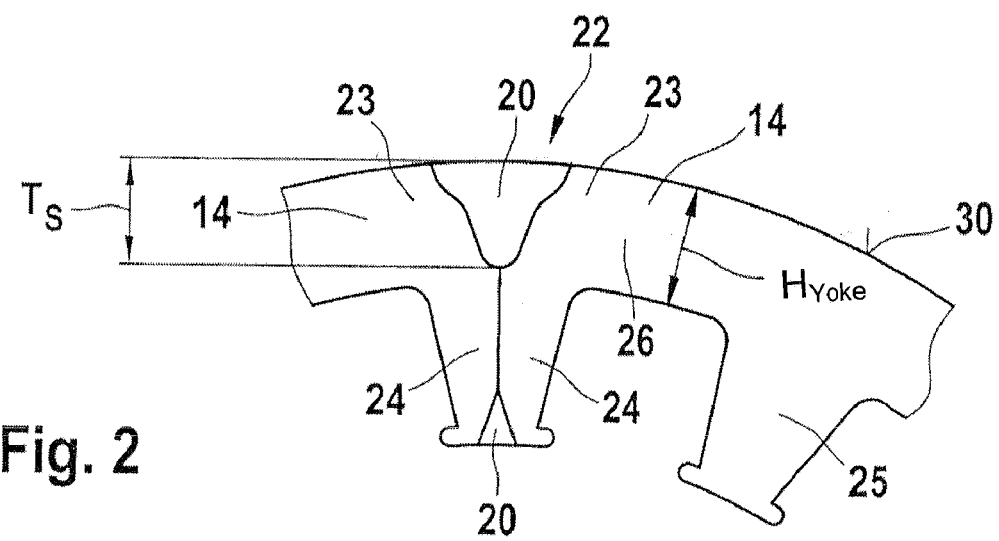
FIG. 2 is a plan view of two exemplary embodiments of welding seams in the joined stator core.

FIG. 2 shows the joint 22. The figure shows each end 23 of the at least one stator core segment 14 on both sides of the joint 22. The two ends 23 are embodied so that one partial tooth 24 rests against another partial tooth 24. The two partial teeth 24 function together as a whole tooth. The welding seam 20 is shown in cross section at the joint 22. In the radial direction, i.e. in the direction along the joint and/or the surface in which the partial teeth 24 rest against each other, the welding seam 20 has a welding seam depth $T_S$. A yoke 26, i.e. a part of the stator core 13 and/or of a stator core segment 14, has a yoke height $H_{yoke}$ between two teeth, for example between a partial tooth 24 and a partial tooth 25.

As a function of the yoke height $H_{yoke}$, the following function should apply for the welding seam depth $T_S$:

$$T_S = 0.5 \text{ mm} * (H_{yoke}/\text{mm} - 1) \pm \Delta T_S,$$

The welding seam depth $T_S$ is therefore a function of the yoke height $H_{yoke}$ and the tolerance value $\Delta T_S$. The function for determining the welding seam depth $T_S$ is therefore comprised of a base function $f_B$ $$f_B = 0.5 \text{ mm} * (H_{yoke}/\text{mm} - 1)$$

as a function of the yoke height $H_{yoke}$ and the additional tolerance value $\Delta T_S$. The variables $H_{yoke}$ and $\Delta T_S$ are expressed in millimeters (mm); the value of ($H_{yoke}$/mm−1) is dimensionless. In the first iteration, $\Delta T_S$ corresponds to the variable $\Delta T_{S1}$, which has a value of 1.0 mm. In the second iteration, $\Delta T_S$ corresponds to the variable $\Delta T_{S2}$, which has a value of 0.5 mm.

Figure 3:
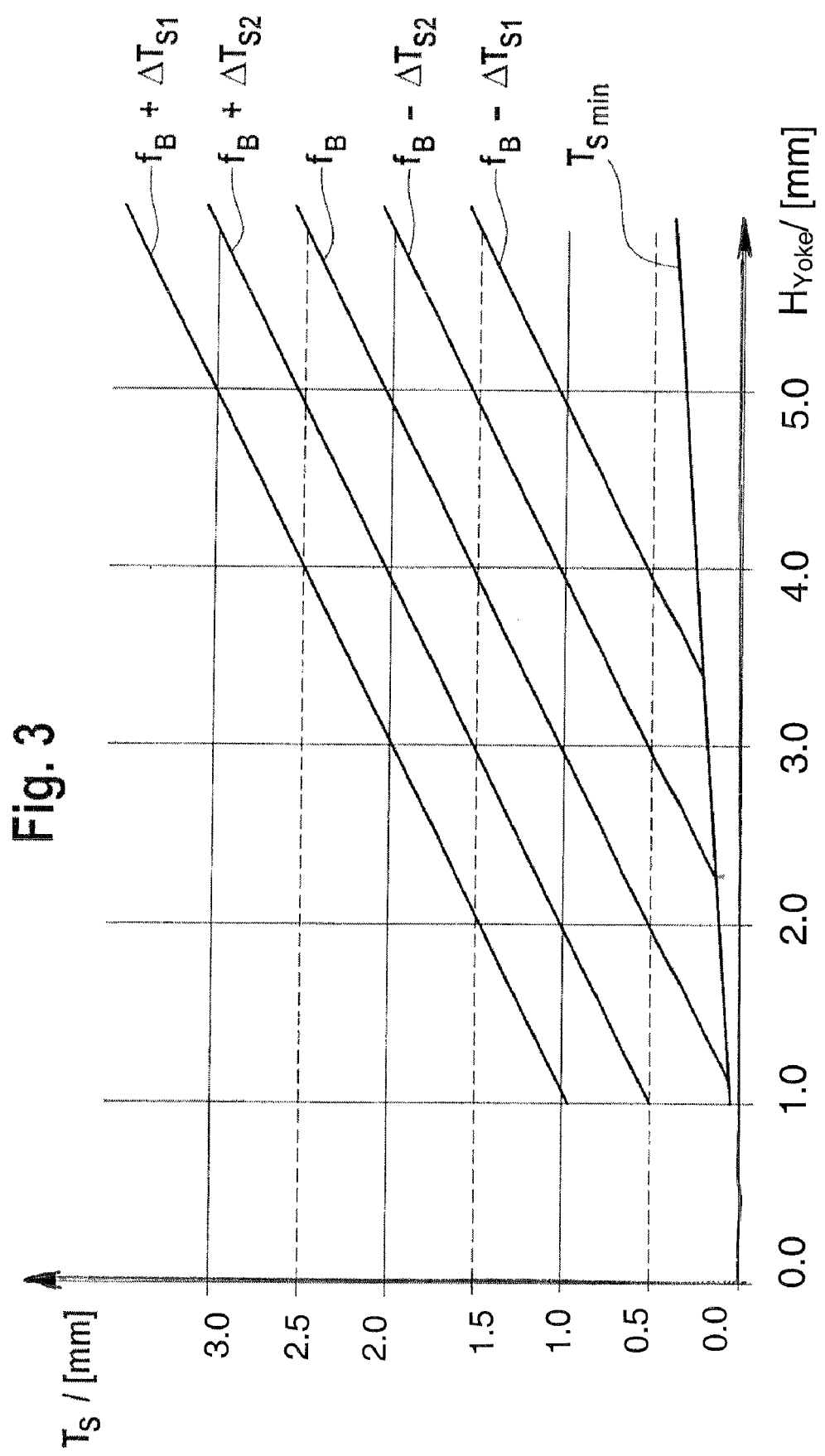
FIG. 3 is a graph showing the dependence of welding seam depth $T_S$ on different parameters.

FIG. 3 shows the function for $T_S$ for the various parameters, i.e. as a function of the yoke height and the tolerance value $\Delta T_S$. FIG. 3 also shows the function of the minimal welding seam depth $T_{Smin}$, which is a function of the yoke height $H_{yoke}$. The function can be described by means of $$T_{Smin} = 3/40 * H_{yoke},$$

Figure 4:
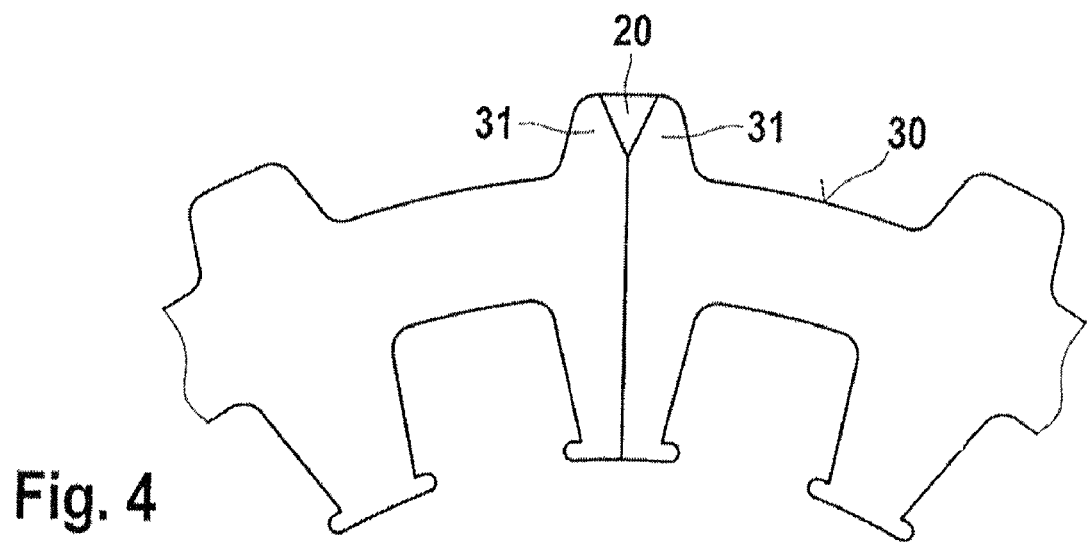
FIGS. 4 and 5 are plan views of two additional exemplary embodiments of welding seams in the joined stator core.

According to another exemplary embodiment, the welding seam 20 is disposed on the outside 30 of the yoke, on a tooth composed of two partial teeth 31, see FIG. 4. In another exemplary embodiment, the welding seam 20 is disposed on a radial inside of at least one end 23 of the stator core segment 14, also see FIG. 2.

Figure 5:
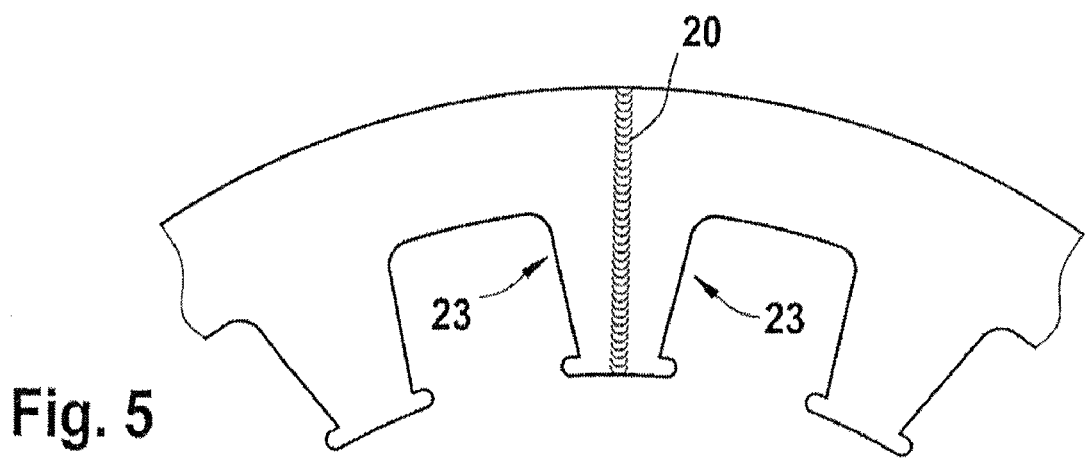

In order to reduce the magnetic noise, a welding seam 20 is disposed on an axial end of the stator 10 and/or stator core 13. This welding seam 20 can also be provided on the axial end surface, see FIG. 5.

Figure 6:
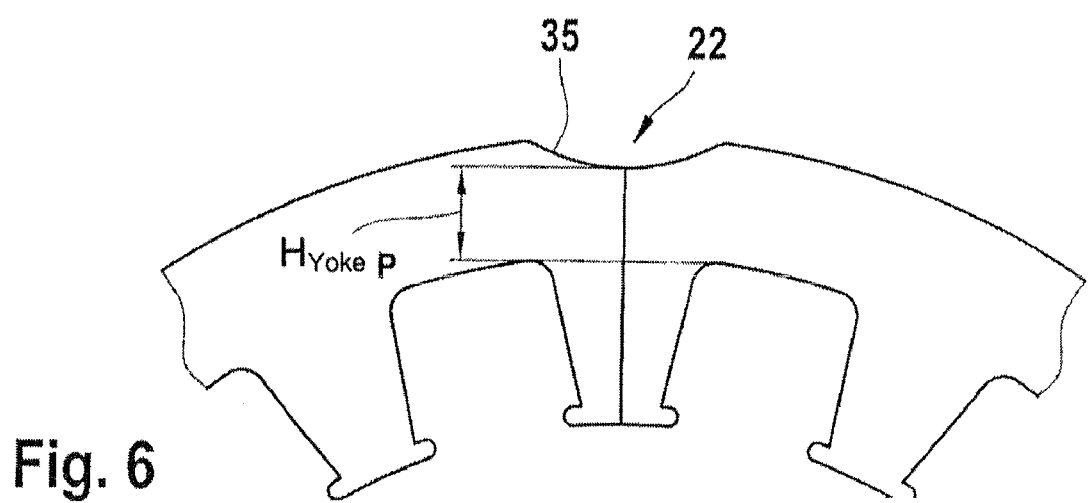
FIG. 6 is a plan view showing the definition of yoke height for a particular embodiment of the yoke with a flute provided at the joint.

If a flute 35 is provided at the joint 22, then the effective yoke height $H_{yoke}$ is not equivalent to the yoke height that has been described above. Here, the projected yoke height $H_{yokeP}$ must be determined as an effective yoke height $H_{yoke}$ that serves as the basis for determining the required welding seam depth $T_S$ according to the equation given at the beginning. To this end, the radial depth of the flute 35 is subtracted from the actual yoke height between two teeth 25, see FIG. 6. In this instance, the value of the projected yoke height $H_{yokeP}$ must be used for the factor $H_{yoke}$.

In order to prevent the welding seam 20 from being too brittle and therefore unable to withstand anything more than small loads, the stator core 13 and/or the stator laminas 15 is comprised of a ferrous material that has a carbon content of no more than 0.1% (by mass). Before the welding procedure is executed, the stator winding 17 is mounted onto the stator core 13 at the joint 22 and then they are both bent together in a circular fashion.

In addition, the welding seam 20 has an ultimate tensile strength of between 10 kN and 44 kN in the circumference direction of the yoke 26. Furthermore, the welding seam should have an ultimate tensile strength of between 20 kN and 36 kN at a depth of between 0.9 mm and 2.2 mm. At depths between 1.1 mm and 1.8 mm, the ultimate tensile strength should be between 22 kN and 32 kN.

What is claimed is:

1. A method of making a stator of an electric machine, said method comprising:
    a) making individual generally strip-shaped laminas (15) for the stator;
    b) stacking the individual laminas (15) to form a stator core (13) with a yoke (26) having a yoke height ($H_{yoke}$), so that one side of the stator core is provided with grooves (18) extending through the core;
    c) producing a subassembly by inserting a stator winding (17) into the grooves (18) of the stator core (13) formed in step b);
    d) bending the subassembly in a circular fashion to form a cylindrical cavity, so that the grooves (18) end in the cavity; and
    e) in order to keep the subassembly in a configuration with the cylindrical cavity, connecting at least two ends (23) of the stator core (13) to each other by means of a welding seam (20);
    f) selecting a depth of the welding seam to give the welding seam a sufficient strength to absorb tensile forces occurring in the welding seam, but at the same time not to exert too excessive a negative influence on magnetic properties at a welding point due to structural changes occurring in the yoke, said selecting including selecting a welding seam depth ($T_S$) of the welding seam (20) as a function of the yoke height ($H_{yoke}$) and a tolerance value ($\Delta T_S$) in accordance with the following formula (I):

$$T_S = 0.5 \text{ mm} * (H_{yoke}/\text{mm} - 1) \pm \Delta T_S \quad \text{(I); and}$$

selecting the welding seam depth ($T_S$) of the welding seam (20) to be not less than a minimum value ($T_{Smin}$) and said minimum value ($T_{Smin}$) to be dependent on the yoke height ($H_{yoke}$) and to be described by the following formula (II): $T_{Smin} = \{3/40\} * H_{Yoke}$.

2. The method as defined in claim 1, further comprising selecting the tolerance value ($\Delta T_S$) to be 1.0 mm.

3. The method as defined in claim 1, further comprising selecting the tolerance value ($\Delta T_S$) to be 0.5 mm.

4. The method as claimed in claim 1, further comprising arranging the welding seam (20) on a radial outside (30) of the yoke (26).

5. The method as claimed in claim 1, further comprising providing the stator core (13) with a plurality of teeth (25), arranging the welding seam (20) on a radial outside (30) of the yoke (26) and arranging the welding seam (20) in one of said teeth, with said one of said teeth comprising two partial teeth (24).

6. The method as claimed in claim 1, further comprising disposing the welding seam (20) on at least one axial end of the stator core (13).

7. The method as claimed in claim 1, further comprising making the welding seam by a laser welding process with a laser beam.

* * * * *